United States Patent
Steele et al.

(10) Patent No.: US 8,134,728 B2
(45) Date of Patent: Mar. 13, 2012

(54) SYSTEM AND METHOD FOR PROXIMITY-BASED PRINTING

(75) Inventors: Jody Steele, Klye, TX (US); Jacob Brown, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 943 days.

(21) Appl. No.: 12/113,368

(22) Filed: May 1, 2008

(65) Prior Publication Data
US 2009/0273801 A1    Nov. 5, 2009

(51) Int. Cl.
*G06F 3/12* (2006.01)
*G06K 15/00* (2006.01)

(52) U.S. Cl. ....... 358/1.15; 358/1.13; 358/1.1; 358/1.18
(58) Field of Classification Search .................. None
See application file for complete search history.

(56) References Cited

U.S. PATENT DOCUMENTS

| | | | |
|---|---|---|---|
| 6,678,750 B2 | 1/2004 | Meade, II et al. | 710/7 |
| 2001/0052995 A1* | 12/2001 | Idehara | 358/1.15 |
| 2007/0264991 A1* | 11/2007 | Jones et al. | 455/420 |
| 2009/0113041 A1* | 4/2009 | Andreazzi | 709/224 |
| 2010/0245885 A1* | 9/2010 | Selvaraj | 358/1.15 |

* cited by examiner

*Primary Examiner* — Dov Popovici
(74) *Attorney, Agent, or Firm* — Baker Botts L.L.P.

(57) ABSTRACT

A system and method for proximity-based printing are disclosed. A method may include communicating access point proximity information from an information handling system to a print server, the access point proximity information including information regarding the proximity of the information handling system to one or more network access points. The method may also include receiving printer proximity information from the print server, the printer proximity information based at least on the access point proximity information and including information regarding the proximity of the information handling system to one or more printers. The method may additionally include displaying the printer proximity information to a user interface. The method may further include receiving from the user interface a user selection of a printer and communicating the user selection to the print server.

20 Claims, 7 Drawing Sheets

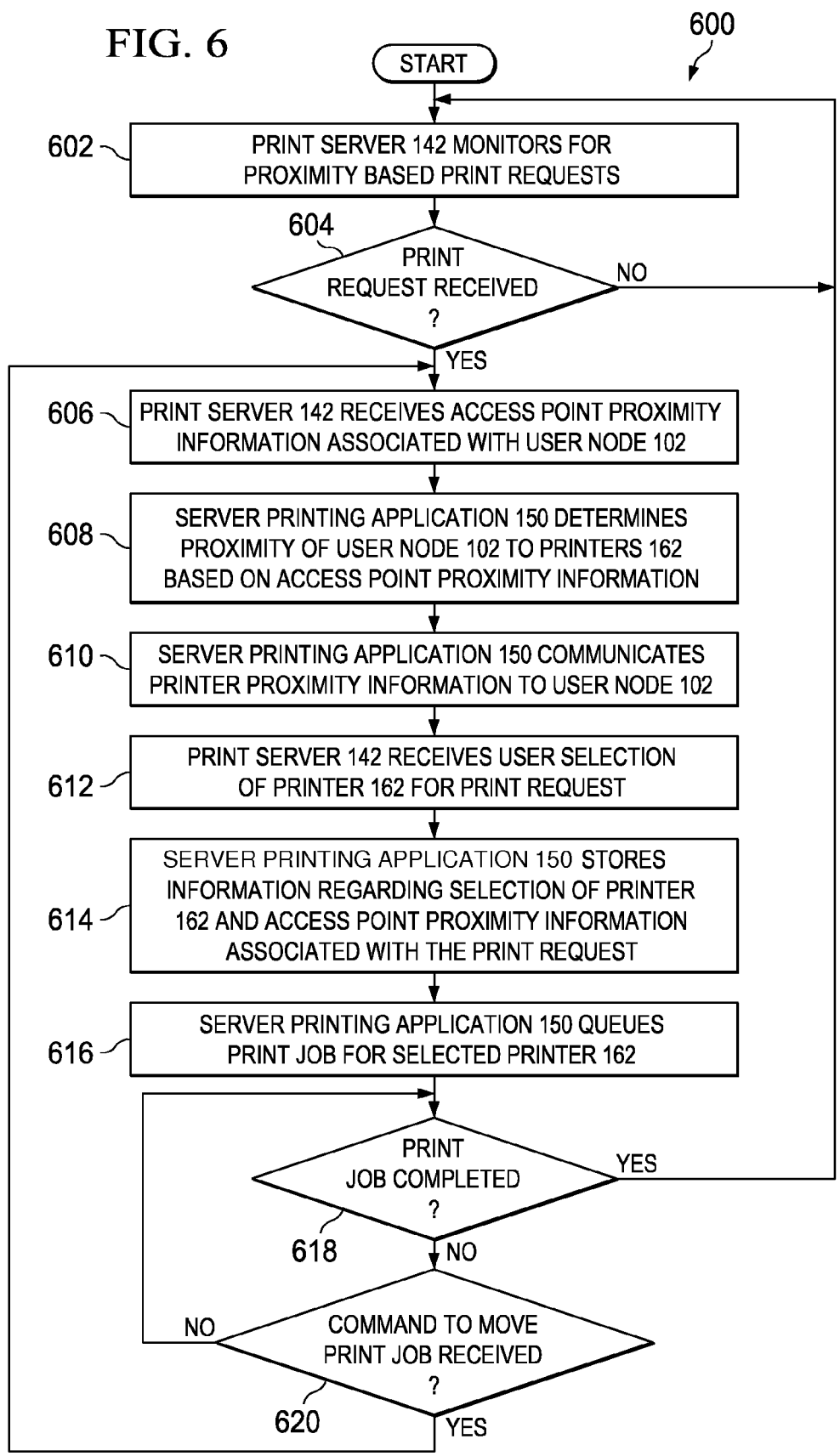

SYSTEM AND METHOD FOR PROXIMITY-BASED PRINTING

TECHNICAL FIELD

The present disclosure relates in general to network printing, and more particularly to a system and method for proximity-based network printing.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

With recent advances in network technology and improved affordability of networking devices, information handling system users are increasingly implementing networks (e.g., local areas networks or LANs) that utilize wireless transmissions (e.g., wireless fidelity or "Wi-Fi") and wire-line transmissions in their homes and/or businesses. For example, users may implement a home or business network including an information handling system, one or more wireless-capable network devices, and a wireless access point communicatively coupled to the information handling system and network devices. Such a network may allow an information handling system (or a user thereof) to communicate with the one or more network devices (e.g., other information handling systems, computers, remote storage media, etc.) via the wireless access point or vice versa.

However, despite such advances, traditional approaches to printing to a network-attached printer from an information handling system may require a user to manually determine the name and location of the closest printer to the information handling system, and then manually select such printer (e.g., via a dialog box on the user interface of the information handling system). In addition, when the information handling system is moved from one location to another (e.g., where the information handling system is a portable computer, such as a laptop or notebook), a user may have to reconfigure printer settings in order to use a network printer proximate to the new location.

SUMMARY

In accordance with the teachings of the present disclosure, disadvantages and problems associated with network printing may be substantially reduced or eliminated.

In accordance with an embodiment of the present disclosure, a method for proximity-based printing is provided. The method may include communicating access point proximity information from an information handling system to a print server, the access point proximity information including information regarding the proximity of the information handling system to one or more network access points. The method may also include receiving printer proximity information from the print server, the printer proximity information based at least on the access point proximity information and including information regarding the proximity of the information handling system to one or more printers. The method may additionally include displaying the printer proximity information to a user interface. The method may further include receiving from the user interface a user selection of a printer and communicating the user selection to the print server.

In accordance with another embodiment of the present disclosure, an information handling system may include a processor and a computer-readable medium communicatively coupled to the processor. The computer-readable medium may have stored thereon a program of instructions. The program of instruction may be configured to, when executed: (a) communicate access point proximity information from an information handling system to a print server, the access point proximity information including information regarding the proximity of the information handling system to one or more network access points; (b) receive printer proximity information from the print server, the printer proximity information based at least on the access point proximity information and including information regarding the proximity of the information handling system to one or more printers; (c) display the printer proximity information to a user interface; (d) receive from the user interface a user selection of a printer; and (e) communicate the user selection to the print server.

In accordance with a further embodiment of the present disclosure, a method for proximity-based printing is provided. The method may include receiving a print request at a print server from an information handling system. The method may also include receiving access point proximity information at the print server from the information handling system, the access point proximity information including information regarding the proximity of the information handling system to one or more network access points. The method may additionally include communicating printer proximity information from the print server to the information handling system, the printer proximity information based at least on the access point proximity information and including information regarding the proximity of the information handling system to one or more printers. The method may further include receiving at the print server from the information handling system a user selection of a printer and communicating the print request from the print server to the selected printer.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 6 illustrates a flow chart of an example method for managing requests for proximity-based printing on a print server, in accordance with the present disclosure.

DETAILED DESCRIPTION

Figure 1:
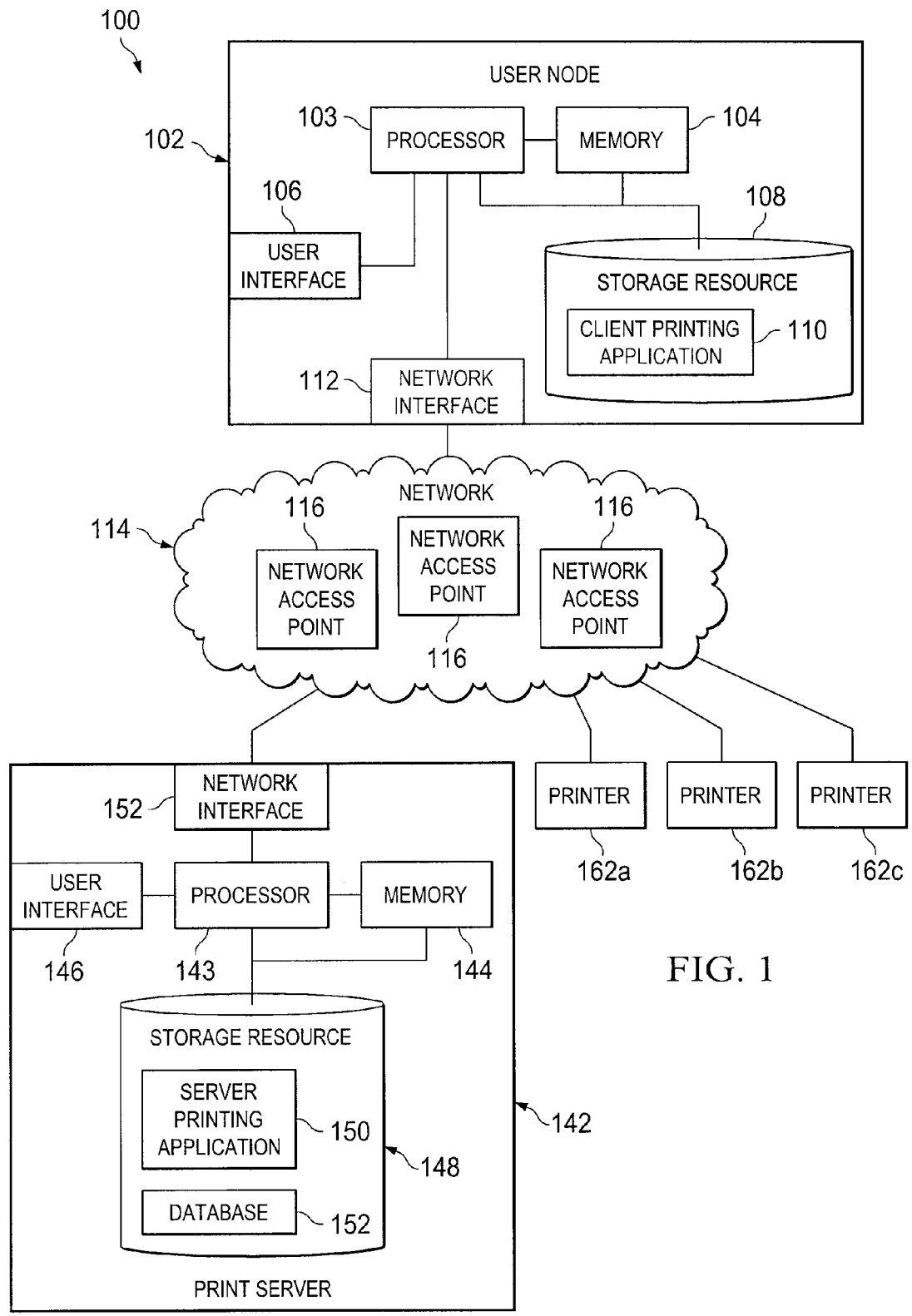
FIG. 1 illustrates a block diagram of an example network system for proximity-based printing, in accordance with an embodiment of the present disclosure.

Preferred embodiments and their advantages are best understood by reference to FIGS. 1-6, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage resource, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

One type of information handling system is a portable computer, also known as a "laptop" and/or "notebook" computer. Portable computers often contain components that are similar to their desktop counterparts and perform the same functions, but are miniaturized and optimized for mobile use and efficient power consumption. For example, portable computers may have liquid crystal displays (LCDs), built-in keyboards, and may utilize a touchpad (also known as a trackpad) or a pointing stick for input, although an external keyboard or mouse may be attached. In addition, portable computers may run on a single main battery or from an external analog current/direct current (AC/DC) adapter that can charge the battery while also supplying power to the computer itself.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

For the purposes of this disclosure, the term "wire-line transmissions" may be used to refer to all types of electromagnetic communications over wires, cables, or other types of conduits. Examples of such conduits include, but are not limited to, metal wires and cables made of copper or aluminum, fiber-optic lines, and cables constructed of other metals or composite materials satisfactory for carrying electromagnetic signals. Wire-line transmissions may be conducted in accordance with teachings of the present disclosure over electrical power lines, electrical power distribution systems, building electrical wiring, conventional telephone lines, Ethernet cabling (10baseT, 100baseT, etc.), coaxial cables, T-1 lines, T-3 lines, ISDN lines, ADSL, and/or any other suitable medium.

For the purposes of this disclosure, the term "wireless transmissions" may be used to refer to all types of electromagnetic communications which do not require a wire, cable, or other types of conduits. Examples of wireless transmissions which may be used include, but are not limited to, personal area networks (PAN) (e.g., BLUETOOTH), local area networks (LAN), wide area networks (WAN), narrowband personal communications services (PCS), broadband PCS, circuit switched cellular, cellular digital packet data (CDPD), radio frequencies, such as the 800 MHz, 900 MHz, 1.9 GHz and 2.4 GHz bands, infra-red and laser.

Examples of wireless transmissions for use in local area networks (LAN) include, but are not limited to, radio frequencies, especially the 900 MHZ and 2.4 GHz bands, for example IEEE 802.11 and BLUETOOTH, as well as infrared, and laser. Examples of wireless transmissions for use in wide area networks (WAN) include, but are not limited to, narrowband personal communications services (nPCS), personal communication services (PCS such as CDMA, TMDA, GSM) circuit switched cellular, and cellular digital packet data (CDPD), etc.

FIG. 1 illustrates a block diagram of an example network system 100 for proximity-based printing, in accordance with an embodiment of the present disclosure. As depicted, system 100 may include a user node 102, a network 114, a print server 142, and one or more printers 162.

User node 102 may comprise an information handling system and may generally be operable to receive data from, and/or transmit data to print server 142 and/or another device via network 114. In certain embodiments, user node 102 may be a portable computer. As shown in FIG. 1, user node 102 may include a processor 103, a memory 104 communicatively coupled to processor 103, a user interface 106, a storage resource 108, and a network interface 112.

Processor 103 may comprise any system, device, or apparatus operable to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, storage resource 108, and/or another component of user node 102.

Memory 104 may be communicatively coupled to processor 103 and may comprise any system, device, or apparatus operable to retain program instructions or data for a period of time (e.g., computer-readable media). Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to user node 102 is turned off.

User interfaces 106 may be communicatively coupled to processor 103 and may include any instrumentality or aggregation of instrumentalities by which a user may interact with user node 102. For example, user interface 106 may permit a user to input data and/or instructions into user node 102 (e.g., via a keyboard, pointing device, and/or other suitable means), and/or otherwise manipulate user node 102 and its associated components. User interface 106 may also permit user node 102 to communicate data to a user, e.g., by means of a display device.

Storage resource 108 may be communicatively coupled to processor 103 and/or memory 104 and may include any system, device, or apparatus operable to retain program instructions or data for a period of time (e.g., computer-readable media) and that retains data after power to user node 102 is turned off. Storage resource 108 may include one or more hard disk drives, magnetic tape libraries, optical disk drives, magneto-optical disk drives, compact disk drives, compact disk arrays, disk array controllers, and/or any computer-readable medium operable to store data. As shown in FIG. 1, storage resource 108 may include a client printing application 110. Client printing application 110 may be any suitable program of instructions configured to manage and/or maintain print jobs originating from user node 102 and communicate print requests associated with such print jobs to print server 142 for printing.

Network interface 112 may include any suitable system, apparatus, or device operable to serve as an interface between user node 102 and network 114. Network interface 112 may enable user node 102 to communicate over network 114 via wireless transmissions and/or wire-line transmissions using any suitable transmission protocol and/or standard, including without limitation all transmission protocols and/or standards enumerated below with respect to the discussion of network 114. In some embodiments, network interface 112 may provide physical access to a networking medium and/or provide a low-level addressing system (e.g., through the use of Media Access Control addresses). In certain embodiments, network interface 112 may include a buffer for storing packets received from network 114 and/or a controller configured to process packets received by network 114.

Network 114 may be a network and/or fabric configured to couple user node 102, print server 142, and printers 162. Network 114 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data), or any combination thereof. Network 114 may transmit data using wireless transmissions and/or wire-line transmissions via any storage and/or communication protocol, including without limitation, Fibre Channel, Frame Relay, Asynchronous Transfer Mode (ATM), Internet protocol (IP), Transmission Control Protocol (TCP), Internet Printing Protocol (IPP), other packet-based protocol, and/or any combination thereof. Network 114 and its various components may be implemented using hardware, software, or any combination thereof. In some embodiments, network 114 may include one or more network access points 116 (e.g., wireless access points) that are configured to receive and/or transmit network data in order to route and/or relay such data among the various components of network system 100.

Each network access point 116 may include any system, device or apparatus operable to communicatively couple one or more devices together to form a network. For example, one or more of network access points 116 may be a wireless access point configured to communicate with other devices via wireless transmissions, and thus may communicatively couple a plurality of wireless communication devices together to form a wireless network. Each network access point 116 may also be configured to communicate to one or more devices via wireline transmissions, and thus may relay data among wireless devices and wired devices. Each network access point 116 may be configured to communicate with other devices via any suitable communication protocol (e.g., TCP/IP) and/or standard (e.g., IEEE 802.11, Wi-Fi).

Print server 142 may include any system, device or apparatus configured to accept print jobs from an information handling system (e.g., user node 102) communicatively coupled to print server 142 and communicate such print jobs to an imaging device (e.g., one or more of printers 162) communicatively coupled to print server 142. As shown in FIG. 1, print server 142 may include a processor 143, a memory 144 communicatively coupled to processor 143, a storage resource 148, and a network interface 152.

Processor 143 may comprise any system, device, or apparatus operable to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 143 may interpret and/or execute program instructions and/or process data stored in memory 144, storage resource 148, and/or another component of print server 142. In these and other embodiments, processor 143 may be similar or identical to processor 103 in design and/or functionality.

Memory 144 may be communicatively coupled to processor 143 and may comprise any system, device, or apparatus operable to retain program instructions or data for a period of time (e.g., computer-readable media). Memory 144 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to print server 142 is turned off. In some embodiments, memory 144 may be similar or identical to memory 104 in design and/or functionality.

User interface 146 may be communicatively coupled to processor 143 and may include any instrumentality or aggregation of instrumentalities by which a user may interact with print server 142. For example, user interface 146 may permit a user to input data and/or instructions into print server 142 (e.g., via a keyboard, pointing device, and/or other suitable means), and/or otherwise manipulate print server 142 and its associated components. User interface 146 may also permit print server 142 to communicate data to a user, e.g., by means of a display device. Although FIG. 1 depicts user interface 146 as a components or aggregation of components local to print server 142, user interface 146 may in some embodiments be located remotely from print server 142 (e.g., by means of a terminal or information handling system coupled to print server via network 114).

Storage resource 148 may be communicatively coupled to processor 143 and/or memory 144 and may include any system, device, or apparatus operable to retain program instructions or data for a period of time (e.g., computer-readable media) and that retains data after power to print server 142 is turned off. Storage resource 148 may include one or more hard disk drives, magnetic tape libraries, optical disk drives, magneto-optical disk drives, compact disk drives, compact disk arrays, disk array controllers, and/or any computer-readable medium operable to store data. In some embodiments, storage resource 148 may be similar or identical to storage resource 108 in design and/or functionality.

As depicted in FIG. 1, storage resource 148 may include a server printing application 150. Server printing application 150 may be any suitable program of instructions configured to receive print requests via network 114, manage and/or maintain such print jobs, and communicate such print jobs to printers 162 for printing. In certain embodiments, server printing application 150 may include a Common Unix Printing System (CUPS) or other suitable software. Also as shown in FIG. 1, storage resource 148 may include a database 152. Database 152 may be any suitable data structure configured to store information regarding printers communicatively coupled to print server 142 (e.g., printers 162), information regarding the locations of such printers, and/or information regarding the proximity of such printers to one or more network access points 116 of network 114.

Network interface 152 may include any suitable system, apparatus, or device operable to serve as an interface between print server 142 and network 114. Network interface 152 may be any suitable system, apparatus, or device operable to serve as an interface between print server 142 and network 114. Network interface 152 may enable print server 142 to communicate over network 114 via wireless transmissions and/or wire-line transmissions using any suitable transmission protocol and/or standard, including without limitation all transmission protocols and/or standards enumerated above with respect to the discussion of network 114. In some embodiments, network interface 152 may provide physical access to a networking medium and/or provide a low-level addressing system (e.g., through the use of Media Access Control addresses). In certain embodiments, network interface 152 may include a buffer for storing packets received from network 114 and/or a controller configured to process packets received by network 114. In some embodiments, network interface 152 may be similar or identical to network interface 112 in design and/or functionality.

Each of printer 162 may include any device, system or apparatus, used alone and/or in combination with one or more information handling systems to print images (e.g., text and/or pictures) on a recording medium (e.g., paper, transparencies, and/or any other suitable medium) using an imaging medium (e.g., toner, ink, and/or other suitable medium). One or more of printers 162 may include, without limitation, a toner-based imaging device or an inkjet imaging device. Each of printers 162*a-c* may individually be referred to herein as "printer 162" or collectively as "printers 162."

For purposes of simplicity, FIG. 1 depicts system 100 having one user node 102. However, system 100 may include any number of user nodes 102. Also for purposes of simplicity, FIG. 1 depicts system 100 having one print server 142. However, system 100 may include any number of print servers 142. Additionally for purposes of simplicity, FIG. 1 depicts system 100 having three printers 162. However, system 100 may include any number of printers 162. In addition, any suitable number and/or type of devices may be included in system 100 in accordance with this disclosure.

In operation, a user (e.g., an administrator or information technology technician) may configure print server 142 and/or printers 162 for proximity-based printing, as described in greater detail below. After print server 142 and/or printers 162 are configured for proximity-based printing, a user of user node 102 may enter a command to print a document using proximity-based printing, and use client printing application 110 to choose from a map or list of proximate printers to which to print the document, also as described in greater detail below. Print server 142 may receive requests to print documents and transmit print jobs to a printer 162 based upon the proximity of user node 102 to printers 162, as described in greater detail below.

Figure 2:
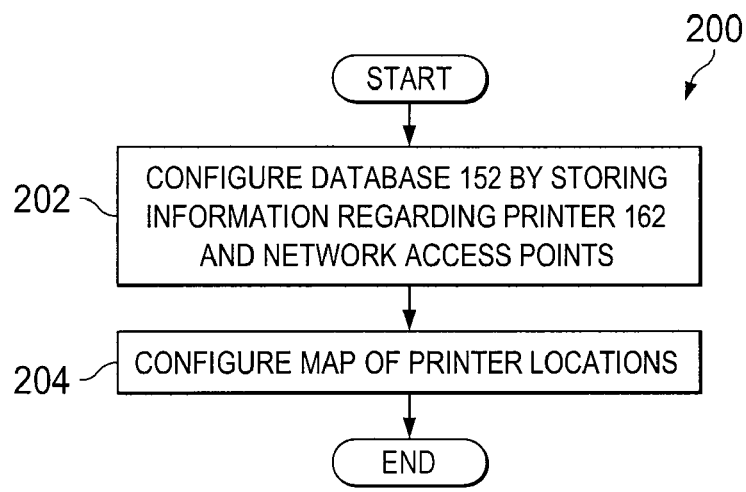
FIG. 2 illustrates a flow chart of an example method for configuring a network system for proximity-based printing, in accordance with the present disclosure.
Figure 3A:
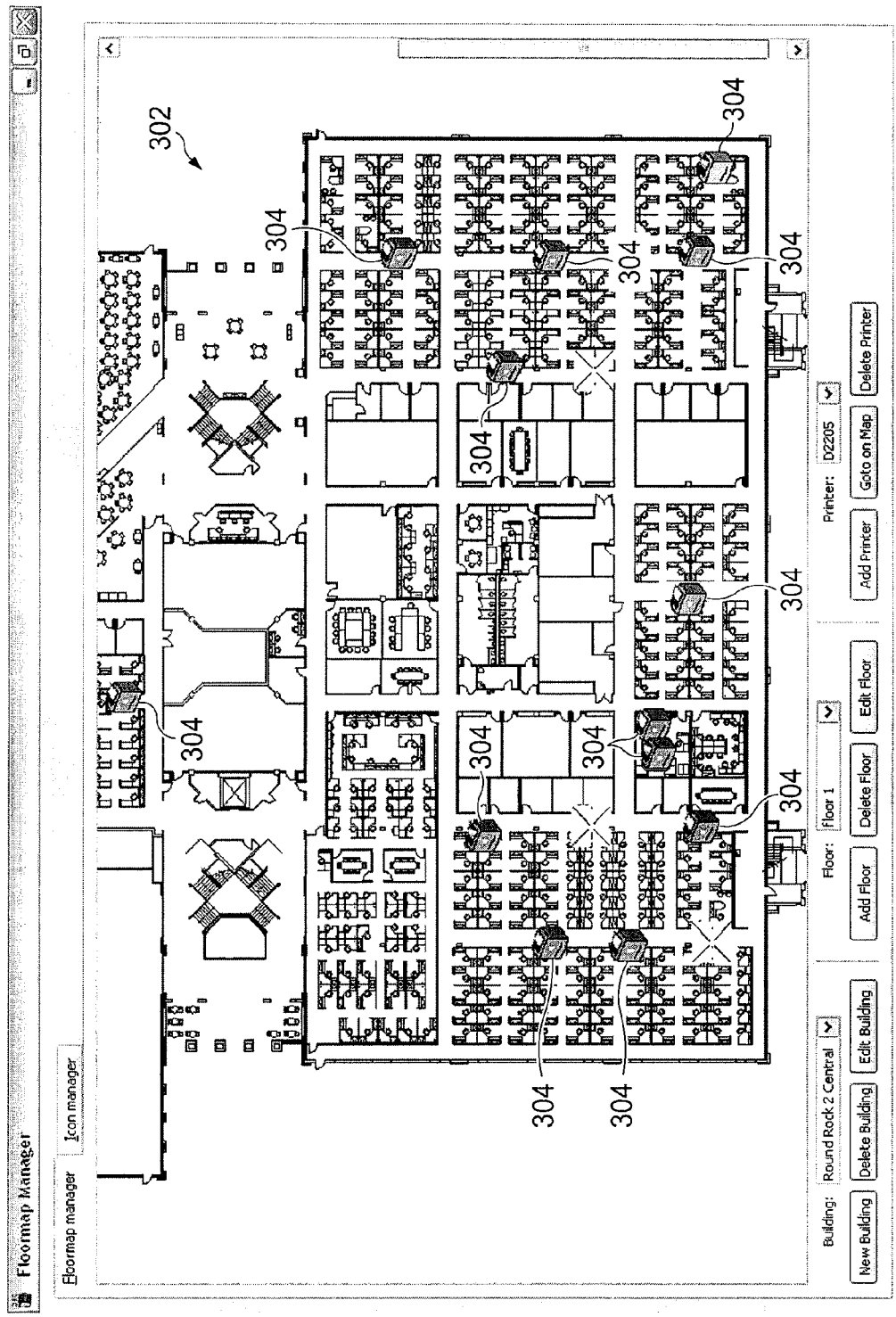
FIGS. 3A-3B illustrate example user interface screens displayed during a method configuring a network system for proximity-based printing, in accordance with the present disclosure.
Figure 3B:
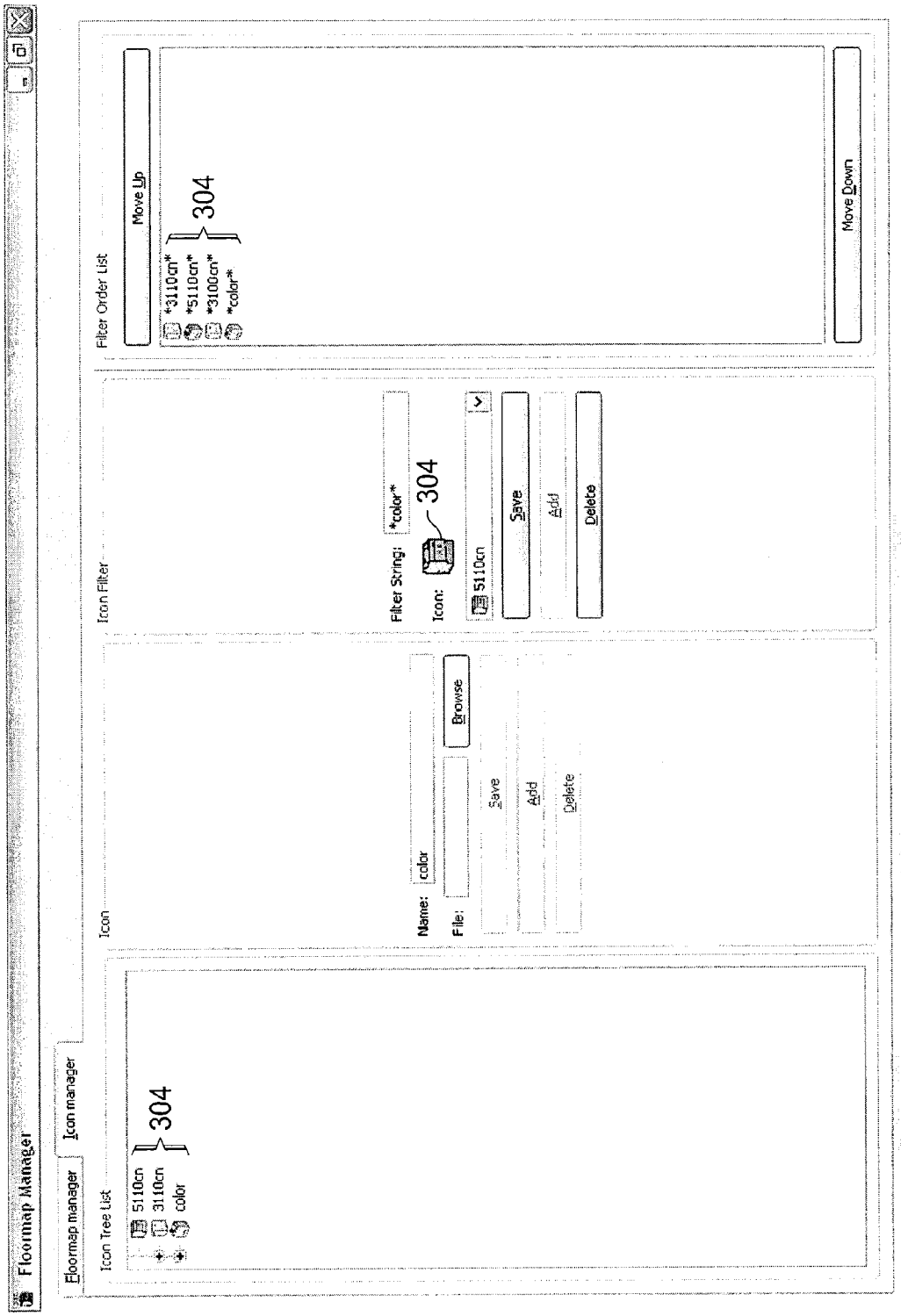

FIG. 2 illustrates a flow chart of an example method 200 for configuring network system 100 for proximity-based printing, in accordance with the present disclosure. FIGS. 3A-3B illustrate example user interface screens displayed during method 200 (e.g., via a display device at user interface 146), in accordance with an example embodiment of the present disclosure. According to one embodiment, method 200 preferably begins at step 202. As noted above, teachings of the present disclosure may be implemented in a variety of configurations of system 100. As such, the preferred initialization point for method 200 and the order of the steps 202-204 comprising method 200 may depend on the implementation chosen.

At step 202, a user (e.g., an administrator or information technology technician) may configure database 152 by storing information in database 152 regarding printers 162 and network access points 116 of network 114. In certain embodiments, the user may also store information regarding proximity of the various printers 162 to the network access points 116.

At step 204, the user may configure a map of printer locations. For example, server printing application 150 may present display to the user a map, floor plan, or other graphical representation of a building to the user via user interface 146. As depicted in FIG. 3A, the user may place (e.g., by using a mouse or pointing device in connection with a display to drag and drop) icons 304 or other graphical representations of printers 162 on map 302 via user interface 146, in accordance with the actual physical locations of printers 162.

In addition, the user may designate different types of icons 304 for different types of printers 162. For example, as shown in FIG. 3B, the user may designate via user interface 146 a certain type of icon 304 to designate a color printer, and a certain type of icon 304 to designate a black-and-white printer. Other icons 304 may be used to designate other parameters regarding printers 162 (e.g., laser, inkjet, supported paper sizes, print speed, brand, manufacturer, model number, etc.).

Although FIG. 2 discloses a particular number of steps to be taken with respect to method 200, it is understood that method 200 may be executed with greater or fewer steps than those depicted in FIG. 2. In addition, in certain embodiments, step 204 may be executed before or substantially contemporaneous with step 202. Method 200 may be implemented using system 100 or any other system operable to implement method 200. In certain embodiments, method 200 may be implemented partially or fully in software and/or firmware embodied in tangible computer-readable media.

Figure 5A:
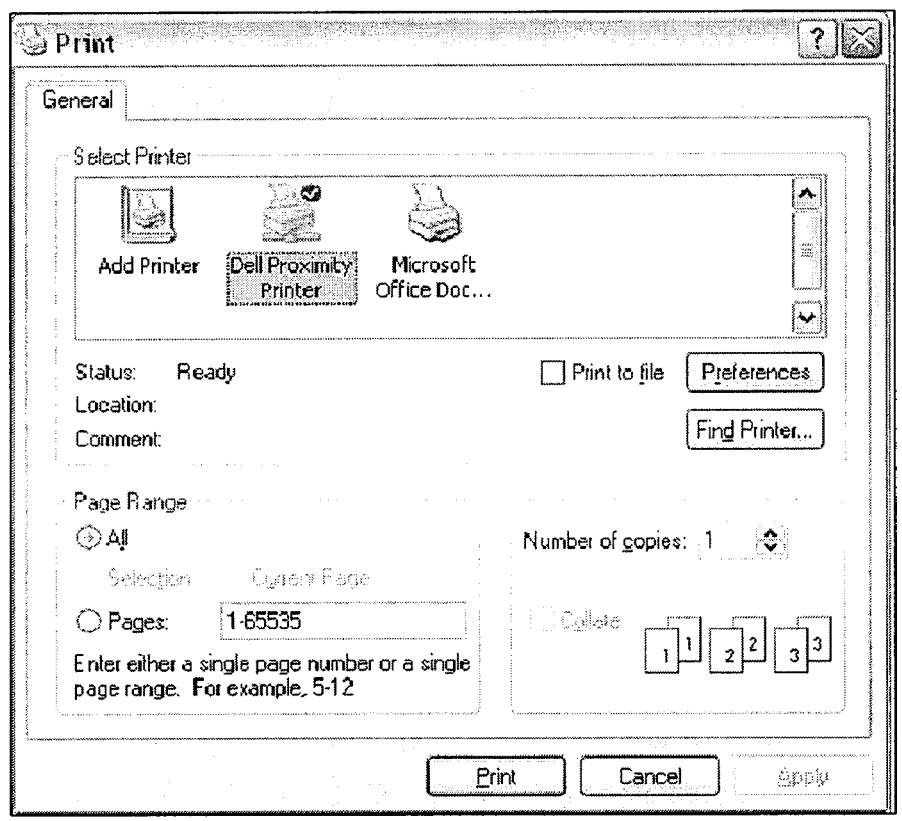
FIGS. 5A-5B illustrate example user interface screens displayed during a method for printing from a user node using proximity-based printing, in accordance with the present disclosure.
Figure 4:
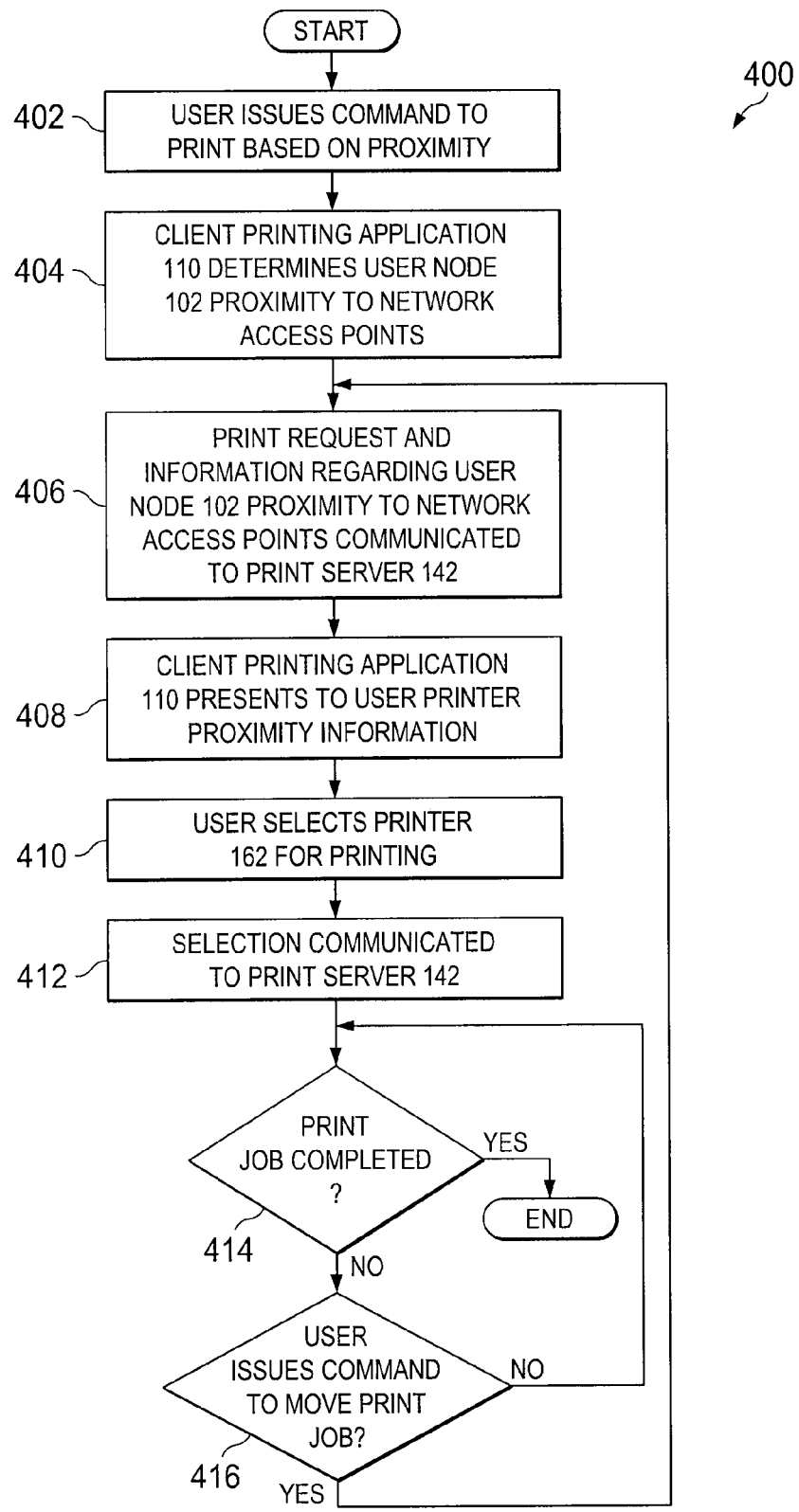
FIG. 4 illustrates a flow chart of an example method for printing from a user node using proximity-based printing, in accordance with the present disclosure.
Figure 5B:
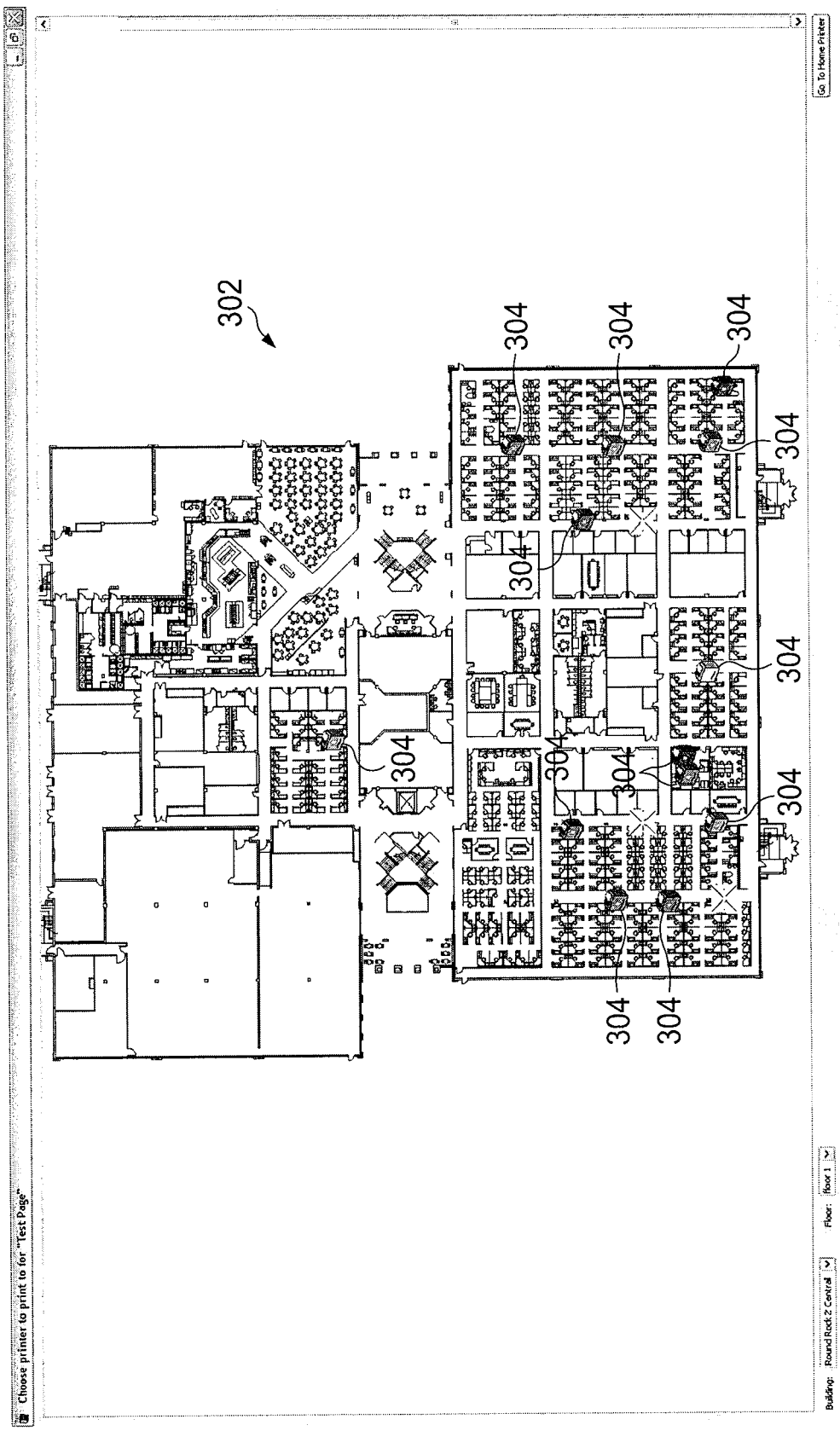

FIG. 4 illustrates a flow chart of an example method 400 for printing from user node 102 using proximity-based printing, in accordance with the present disclosure. FIGS. 5A-5B illustrate example user interface screens displayed during method 400 (e.g., via a display device of user interface 106) in accordance with the present disclosure. According to one embodiment, method 400 preferably begins at step 402. As noted above, teachings of the present disclosure may be implemented in a variety of configurations of system 100. As such, the preferred initialization point for method 400 and the order of the steps 402-416 comprising method 400 may depend on the implementation chosen.

At step 402, a user of user node 102 may issue a command to print using proximity-based printing. For example, via user interface 106, the user may select a command to print (e.g., via a "file" menu in an application program running on user node 102). In certain embodiments, after the user issues a command to print, user node 102 may present the user with a dialog box via user interface 106 allowing the user to select a printer, as shown in FIG. 5A. The user may then select an option to select a printer based on proximity (e.g., by selecting the "Dell Proximity Printer" option) in FIG. 5A.

At step 404, in response to the command to use proximity-based printing, client printing application 110 may determine the proximity of user node 102 to network access points 116 of network 114. For example, client printing application may determine the signal strength of one or more network access points 116 at user node 102.

At step 406, client printing application may communicate the proximity-based print request and the information regarding user node 102 proximity to the network access points 116 (hereinafter referred to as the "access point proximity information") to print server 142 via network 114.

At step 408, client printing application 110 may present to the user via user interface 106 printer proximity information. The printer proximity information may include the identity of one or more printers 162 and/or an indication of the proximity of each of the one or printers 162 to user node 102. The printer proximity information may be determined based at least on the access point proximity information communicated at step 406, as described in greater detail below with respect to FIG. 6.

In some embodiments, printer proximity information may be in the form of a list. In other embodiments, printer proximity information may include and/or be presented as a map or other graphical representation, as shown in FIG. 5B, for example. As depicted in FIG. 5B, such a map may display a building floor plan 302 or other graphical information including icons 304 showing the approximate locations of the one or more printers 162 within the building floor plan 302.

In some embodiments, one or more features of icons 304 displayed may indicate the proximity of the one or more printers 162 to user node 102. For example, printers 162 closer to user node 102 may be depicted by icons 304 of a different color or a different shade than those icons 304 associated with printers 162 farther away from user node 102 (e.g., "close" printers 162 may be represented by an icon 304 with a light green color, and icons 304 representing more distant printers 162 may have increasing darker shades of green as the distance from user node 102 increases). Icons may also indicate other parameters of their associated printers 162, for example the operational status of a printer 162 (e.g., green for online, red for offline), type of printer (e.g., laser or inkjet; color or black and white), supported paper sizes (e.g., 8×11, 8×14, 11×17, A4, etc.), print speed, brand, manufacturer, model number, etc.

At step 410, the user may select a printer 162 for printing. For example, in embodiments in which the printer proximity information is displayed via a map, the use may click or otherwise select an icon 304 associated with a printer 162 to which the user desires to print.

As step 412, the user's selection of printer 162 may be communicated to print server 142. At step 414, client printing application 110 may monitor whether the print job has completed. If the print job completes, method 400 may end. Otherwise, if the print job remains incomplete, method 400 may proceed to step 416.

At step 416, client printing application 110 may monitor for whether the user has issued a command to move the print job to a printer 162 other than the printer selected at step 410 above. If the user has not issued a command to move the print job, method 400 may proceed to step 414. Otherwise, if the user issues a command to move the print job, method 400 may proceed to step 406.

Although FIG. 4 discloses a particular number of steps to be taken with respect to method 400, it is understood that method 400 may be executed with greater or lesser steps than those depicted in FIG. 4. In addition, although FIG. 4 discloses a certain order of steps to be taken with respect to method 400, the steps comprising method 400 may be completed in any suitable order. Method 400 may be implemented using system 100 or any other system operable to implement method 400. In certain embodiments, method 400 may be implemented partially or fully in software and/or Firmware embodied in tangible computer-readable media.

FIG. 6 illustrates a flow chart of an example method 600 for managing requests for proximity-based printing on print server 142, in accordance with the present disclosure. According to one embodiment, method 600 preferably begins at step 602. As noted above, teachings of the present disclosure may be implemented in a variety of configurations of system 100. As such, the preferred initialization point for method 600 and the order of the steps 602-620 comprising method 600 may depend on the implementation chosen.

At step 602, print server 142 may monitor for proximity-based print requests from network 114. If a print request is received at step 604, method 600 may proceed to step 606. Otherwise, if a print request is not received, method 600 may proceed again to step 602 where print server 142 will continue to monitor for proximity-based print requests.

At step 606, print server 142 may receive access point proximity information associated with a user node 102 from which the print request originated.

At step 608, server printing application 150 may determine the proximity of user node 102 to one or more printers 162 (the "printer proximity information") based on at least the access point proximity information. In some embodiments, database 152 may include information regarding the locations of printers 162 relative to one or more network access points 116 of network 114. In such embodiments, server printing application 150 may apply an algorithm to the information in database 152 and the access point proximity information to determine the printer proximity information. In the same or alternative embodiments, database 152 may include historical information regarding printers 162 selected in the past and the access point proximity information associated with such selections. In such embodiments, server printing application 150 may "learn" (e.g., via an adaptive learning process and/or neural network) the proximity of network access points 116 to printers 162 in order to intelligently determine the printer proximity information.

At step 610, server printing application 150 may communicate printer proximity information to user node 102 to allow a user at user node 102 to select a printer 162 based on the printer proximity information. At step 612, print server 142 may receive the user selection of a printer 162 to which the print request is to be sent.

At step 614, server printing application 150 may store information in database 150 regarding the user's selection of printer 162 and the access point proximity information associated with the print request. Such information may become historical information that may be used in the future to determine printer proximity information based on access point proximity information (e.g., via an adaptive learning process as described above with respect to step 608).

At step 616, server printing application 150 may queue the print job for the selected printer 162.

At step 618, server printing application 150 may monitor whether the print job has completed. If the print job completes, method 600 may end. Otherwise, if the print job remains incomplete, method 600 may proceed to step 620.

At step 620, server printing application 150 may monitor for whether the user (e.g., a user at user node 102 or a network administrator) has issued to move the print job to a printer 162 other than the printer 162 originally selected by the user. If server printing application 150 has not received a command to move the print job, method 600 may proceed to step 618. Otherwise, if server printing application receives a command to move the print job, method 600 may proceed to step 606.

Although FIG. 6 discloses a particular number of steps to be taken with respect to method 600, it is understood that method 600 may be executed with greater or fewer steps than those depicted in FIG. 6. In addition, although FIG. 6 discloses a certain order of steps to be taken with respect to method 600, the steps comprising method 600 may be completed in any suitable order. Method 600 may be implemented using system 100 or any other system operable to implement method 600. In certain embodiments, method 600 may be implemented partially or fully in software and/or Firmware embodied in tangible computer-readable media.

The methods and systems disclosed in this disclosure may provide advantages over traditional approaches to network printing. For example, the systems and methods disclosed herein allow a user desiring to print a document from a user node to be presented with information regarding printers in proximity to the user node, and further allow the user to select a printer based on the presented printer proximity information. Accordingly, a user may not need to reconfigure printer settings when the user node is moved to a different location within a network, as is often the case under traditional network printing approaches.

Although the present disclosure has been described in detail, it should be understood that various changes, substitutions, and alterations can be made hereto without departing from the spirit and the scope of the invention as defined by the appended claims.

What is claimed is:

1. A method for proximity-based printing, comprising:
communicating access point proximity information from an information handling system to a print server, the access point proximity information including information regarding the proximity of the information handling system to one or more network access points;
receiving printer proximity information from the print server, the printer proximity information based at least on the access point proximity information and including information regarding the proximity of the information handling system to one or more printers;
displaying the printer proximity information to a user interface;
receiving from the user interface a user selection of a printer; and
communicating the user selection to the print server.

2. A method according to claim 1, wherein displaying the printer proximity information to the user interface includes displaying a list of one or more printers to the user interface.

3. A method according to claim 1, wherein displaying the printer proximity information to the user interface includes displaying a map to the user interface.

4. A method according to claim 3, wherein the map includes:
a building floor plan; and
one or more icons, each icon representing the approximate location of a respective printer in the building floor plan.

5. A method according to claim 4, wherein each of the one or more icons includes a feature indicating the approximate proximity of its respective printer to the information handling system.

6. A method according to claim 5, wherein the feature includes a color.

7. A method according to claim 4, wherein each of the one or more icons includes a feature indicating at least one of an operational status of its respective printer, a printer type of its associated printer, a supported paper size of its associated printer, a print speed of its associated printer, a brand of its associated printer, a manufacturer of its associated printer, and a model number of its associated printer.

8. An information handling system, comprising:
a processor; and
a non-transitory computer-readable medium communicatively coupled to the processor having stored thereon a program of instructions configured to, when executed:
communicate access point proximity information from the information handling system to a print server, the access point proximity information including information regarding the proximity of the information handling system to one or more network access points;
receive printer proximity information from the print server, the printer proximity information based at least on the access point proximity information and including information regarding the proximity of the information handling system to one or more printers;
display the printer proximity information to a user interface;
receive from the user interface a user selection of a printer; and
communicate the user selection to the print server.

9. An information handling system according to claim 8, the program of instructions configured to display the printer proximity information to the user interface by displaying a list of one or more printers to the user interface.

10. An information handling system according to claim 8, the program of instructions configured to display the printer proximity information to the user interface by displaying a map to the user interface.

11. An information handling system according to claim 10, wherein the map includes:
a building floor plan; and
one or more icons, each icon representing the approximate location of a respective printer in the building floor plan.

12. An information handling system according to claim 11, wherein each of the one or more icons includes a feature indicating the approximate proximity of its respective printer to the information handling system.

13. An information handling system according to claim 12, wherein the feature includes a color.

14. An information handling system according to claim 11, wherein each of the one or more icons includes a feature indicating at least one of an operational status of its respective printer, a printer type of its associated printer, a supported paper size of its associated printer, a print speed of its associated printer, a brand of its associated printer, a manufacturer of its associated printer, and a model number of its associated printer.

15. A method for proximity-based printing, comprising:
receiving a print request at a print server from an information handling system;
receiving access point proximity information at the print server from the information handling system, the access point proximity information including information regarding the proximity of the information handling system to one or more network access points;
communicating printer proximity information from the print server to the information handling system, the printer proximity information based at least on the access point proximity information and including information regarding the proximity of the information handling system to one or more printers;
receiving at the print server from the information handling system a user selection of a selected printer; and
communicating the print request from the print server to the selected printer.

16. A method according to claim 15, the printer proximity information based at least on historical information regarding printers selected in the past and historical access point proximity information associated with such past selections.

17. A method according to claim 15, further comprising storing information regarding the user selection and the access point proximity information associated with the print request.

18. An information handling system, comprising:
a processor;
a non-transitory computer-readable medium communicatively coupled to the processor having stored thereon a program of instructions configured to, when executed:
receive a print request at the information handling system from a second information handling system;
receive access point proximity information at the information handling system from the second information handling system, the access point proximity information including information regarding the proximity of the second information handling system to one or more network access points;
communicate printer proximity information from the information handling system to the second information handling system, the printer proximity information based at least on the access point proximity information and including information regarding the proximity of the second information handling system to one or more printers;
receive at the information handling system from the second information handling system a user selection of a selected printer; and
communicate the print request from the information handling system to the selected printer.

19. An information handling system according to claim 18, the printer proximity information based at least on historical information regarding printers selected in the past and historical access point proximity information associated with such past selections.

20. An information handling system according to claim 18, wherein the program of instructions comprises a Common Unix Printing System (CUPS).

* * * * *